United States Patent
Wolk

(10) Patent No.: US 9,051,903 B2
(45) Date of Patent: Jun. 9, 2015

(54) NO$_x$ EMISSION CONTROL USING LARGE VOLUME EGR

(75) Inventor: Matthew Thomas Wolk, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 65 days.

(21) Appl. No.: 13/594,085

(22) Filed: Aug. 24, 2012

(65) Prior Publication Data

US 2014/0053553 A1 Feb. 27, 2014

(51) Int. Cl.
*F02B 33/44* (2006.01)
*F02M 25/07* (2006.01)
*F02B 33/00* (2006.01)
*F02B 37/24* (2006.01)
*F02B 37/00* (2006.01)
*F02B 37/013* (2006.01)
*F02B 37/16* (2006.01)
(Continued)

(52) U.S. Cl.
CPC ............ *F02M 25/0745* (2013.01); *F02B 37/24* (2013.01); *Y02T 10/144* (2013.01); *F02D 41/0065* (2013.01); *F02B 37/004* (2013.01); *F02B 37/013* (2013.01); *F02B 37/16* (2013.01); *F02M 25/0711* (2013.01); *F02M 25/0713* (2013.01); *F02M 25/0719* (2013.01); *F02M 25/0724* (2013.01); *F02M 25/0749* (2013.01); *F02D 41/0007* (2013.01); *F02D 41/005* (2013.01); *Y02T 10/47* (2013.01); *F02B 37/127* (2013.01)

(58) Field of Classification Search
CPC .......... F02B 37/00; F02B 37/24; F02B 37/16; F02B 37/013; F02B 37/004; F02M 25/0707; F02M 25/0745; F02M 25/0715; F02M 25/0751

USPC .......... 60/605.2, 612; 123/562, 568.11, 568.2
See application file for complete search history.

(56) References Cited

U.S. PATENT DOCUMENTS

| | | | |
|---|---|---|---|
| 2,173,595 A | * | 9/1939 | Schutte .......................... 60/612 |
| 6,014,960 A | | 1/2000 | Oleksiewicz |
| 6,067,800 A | | 5/2000 | Kolmanovsky et al. |

(Continued)

FOREIGN PATENT DOCUMENTS

EP 2166211 A1 * 3/2010 ............ F02B 37/013

OTHER PUBLICATIONS

Ford Motor Company, "6.0L Technician Reference Manual—Power Stroke Diesel", 2002, pp. 34-36 (see attached).*

*Primary Examiner* — Thai Ba Trieu
*Assistant Examiner* — Ngoc T Nguyen
(74) *Attorney, Agent, or Firm* — Miller, Matthias & Hull LLP

(57) ABSTRACT

An EGR system is disclosed for reducing NO$_x$ emissions and that may eliminate the need for a SCR system. The disclosed EGR system includes dual valves, including a hot EGR valve disposed in the exhaust manifold and a cold EGR valve disposed upstream of the intake manifold. A VGT turbine with adjustable vanes may also be employed with a low pressure turbine. Intake air may proceed through both a high pressure compressor as well as a low pressure compressor and the high pressure compressor may be substantially bypassed by way of a bypass valve disposed between the low pressure compressor and the air intake. The EGR system may be controlled by adjusting the positions of the valves and VGT turbine vanes.

18 Claims, 1 Drawing Sheet

(51) Int. Cl.
*F02B 37/12* (2006.01)
*F02D 41/00* (2006.01)

(56) References Cited

U.S. PATENT DOCUMENTS

| | | | |
|---|---|---|---|
| 6,128,902 A | 10/2000 | Kolmanovsky et al. | |
| 6,148,616 A | 11/2000 | Yoshida et al. | |
| 6,247,311 B1 | 6/2001 | Itoyama et al. | |
| 6,286,489 B1* | 9/2001 | Bailey | 123/568.11 |
| 6,354,084 B1* | 3/2002 | McKinley et al. | 60/605.2 |
| 6,408,834 B1 | 6/2002 | Brackney et al. | |
| 6,460,522 B1 | 10/2002 | Rimnac | |
| 6,604,361 B2 | 8/2003 | Buckland et al. | |
| 6,752,132 B2* | 6/2004 | Remmels et al. | 123/568.11 |
| 6,782,696 B2 | 8/2004 | Shigahara et al. | |
| 6,899,090 B2 | 5/2005 | Arnold | |
| 7,076,953 B2 | 7/2006 | Kreso | |
| 7,191,052 B2 | 3/2007 | Barba et al. | |
| 7,284,375 B2 | 10/2007 | Butscher et al. | |
| 7,311,090 B2* | 12/2007 | Lyons | 123/568.11 |
| 7,357,125 B2 | 4/2008 | Kolavennu | |
| 7,520,126 B2* | 4/2009 | Takeshima et al. | 60/301 |
| 7,614,231 B2 | 11/2009 | Allain et al. | |
| 2007/0056283 A1 | 3/2007 | Klingel | |
| 2009/0178405 A1 | 7/2009 | Chadwell | |
| 2009/0199825 A1* | 8/2009 | Piper et al. | 60/605.2 |
| 2011/0000470 A1* | 1/2011 | Roth | 123/568.11 |
| 2011/0146272 A1* | 6/2011 | Ferrero et al. | 60/605.2 |
| 2011/0307127 A1* | 12/2011 | Swenson et al. | 60/605.2 |
| 2012/0260897 A1* | 10/2012 | Hayman et al. | 123/568.2 |
| 2013/0000614 A1* | 1/2013 | Freund et al. | 123/568.2 |
| 2013/0220286 A1* | 8/2013 | Gingrich et al. | 123/568.11 |
| 2013/0283766 A1* | 10/2013 | Primus et al. | 60/274 |

* cited by examiner

$NO_x$ EMISSION CONTROL USING LARGE VOLUME EGR

TECHNICAL FIELD

This disclosure relates to exhaust gas recirculation (EGR) systems for reducing $NO_x$ emissions. More specifically, this disclosure relates to EGR systems that recirculate large volumes of exhaust to eliminate or at least reduce the need for a catalytic system in addition to the disclosed EGR systems.

BACKGROUND

An internal combustion (IC) engine may include an exhaust gas recirculation (EGR) system for controlling the generation of undesirable pollutant gases and particulate matter. EGR systems recirculate exhaust gases and particular matter into the intake air supply of the IC engine. The exhaust gases, which are recirculated to the engine cylinders, reduce the concentration of oxygen in the cylinders, which lowers the maximum combustion temperature in the cylinders and slows the chemical reaction of the combustion process. As a result, a decrease in nitrous oxides ($NO_x$) formation is achieved. Furthermore, the exhaust gases typically contain unburned hydrocarbons which are burned upon recirculation the engine cylinder and which further reduces the emission of exhaust gas by-products.

An IC engine may also include one or more turbochargers for compressing air which is supplied to one or more combustion chambers of corresponding combustion cylinders. Each turbocharger typically includes a turbine driven by exhaust gases of the engine and a compressor which is driven by the turbine. The compressor receives the air to be compressed and supplies the compressed air to the combustion chambers. The compressor may also be used to compress a fuel/air mixture as well as air.

When utilizing EGR in a turbocharged diesel engine, the exhaust gases to be recirculated may be removed upstream of the exhaust gas driven turbine associated with the turbocharger. In many EGR applications, the exhaust gas is diverted by a poppet-type EGR valve downstream from the exhaust manifold. The percentage of the total exhaust flow which is diverted for introduction into the intake manifold of the engine is known as the "EGR rate" of the engine. One example of an EGR system can be found in U.S. Pat. No. 6,128,902, which discloses an EGR valve 34 disposed in a conduit 32 that connects the exhaust manifold 28 to the intake manifold 26.

Variable-geometry turbochargers (VGTs) are a family of turbochargers, usually designed to allow the effective aspect ratio (sometimes called A/R ratio) of the VGT turbine to be altered as conditions change. A VGT turbine typically has a set of movable vanes to control pressure of the exhaust flowing through the VGT turbine. At low engine speeds when exhaust flow is low, the vanes are partially closed to accelerate the VGT turbine. Accelerating the VGT turbine increases boost pressure delivered by the compressor that is driven by the VGT turbine. As the engine speed increases, the vanes are opened to slow down the VGT turbine. Slowing down the VGT turbine prevents the boost pressure provided by the compressor from reaching excessive levels.

VGTs have proven useful because an optimum aspect ratio at low engine speeds is different from an optimum aspect ratio at high engine speeds. If the aspect ratio is too large, the turbocharger may fail to create boost at low speeds; if the aspect ratio is too small, the turbocharger may choke the engine at high speeds, leading to high exhaust manifold pressures, high pumping losses, and ultimately lower power output.

By altering the vane positions as the engine accelerates, the aspect ratio of the VGT turbine can be maintained at its optimum. As a result, VGTs have a minimal amount of lag, have a low boost threshold, and are very efficient at higher engine speeds. VGTs tend to be much more common on diesel engines because the lower exhaust temperatures of diesel engines means the VGTs are less prone to failure.

Selective catalytic reduction (SCR) systems catalytically convert $NO_x$ to nitrogen and water. A gaseous reductant, typically urea or ammonia, is added to the exhaust gas stream where it is adsorbed onto the catalyst. Carbon dioxide is a reaction product when urea is used as the reductant. Because of the need to supply both a reductant and a catalyst, SCR systems tend to be space intensive and are most appropriate for large utility boilers, industrial boilers, and municipal solid waste boilers. However, due to increasingly stringent emission standards, recent applications include diesel engines. Further, because current EGR systems do not meet Tier4 admission standards, the combination of EGR and SCR systems in diesel engine designs has become common.

However, an SCR system requires the driver or maintenance staffer to replenish an on-board urea or ammonia tank that contains the reactant in an aqueous solution. Further, operators must buy and store the solution or have drivers find it while on the road. A pump pushes the solution out of the tank. Because the solution is about two-thirds purified water, a heater is used in the tank or line between it and the dosing chamber, where solution is injected downstream of the particulate filter. This equipment plus the solution, which weighs about 9 pounds per gallon, adds 200 to 400 pounds and occupies precious space on a truck. This can be a major drawback to any weight-conscious owner and presents packaging problems for manufacturers of diesel trucks and other equipment that includes an SCR.

Thus, there is a need for an improved emission control system for internal combustion engines that can meet the new stringent emission requirements in terms of $NO_x$, yet avoid the disadvantages of SCR systems and the combination of EGR and SCR systems.

SUMMARY OF THE DISCLOSURE

In one aspect, a method for controlling an internal combustion engine is disclosed. The engine may include an engine block that defines a plurality of cylinders, an intake manifold, an exhaust manifold, a controller and an exhaust gas recirculation (EGR) system. The EGR system may include a cold EGR valve in combination with the intake manifold and a hot EGR valve in communication with the exhaust manifold. The EGR system may circulate a portion of the exhaust gases from the exhaust manifold to the intake manifold through the cold EGR valve. The controller may communicate with hot and cold EGR valves. The method may include adjusting the cold EGR valve and adjusting the hot EGR valve to vary a portion of the exhaust gases directed from the exhaust manifold to the intake manifold, depending upon a load condition of the engine. As a result, the portion of the exhaust gases provided to the plurality of cylinders by the EGR system may be greater than 40% of the total exhaust gases output from all of the cylinders.

In another aspect, an internal combustion engine is disclosed. The engine may include a cold exhaust gas recirculation (EGR) valve that is adjustable between an open position and a closed position. The engine may also include an intake manifold that receives recirculated exhaust gas from the cold EGR valve when the cold EGR valve is not in the closed position. The engine may further include at least one combustion cylinder in communication with the intake manifold and an exhaust manifold in communication with the at least one combustion cylinder and a turbine. The engine may further include a hot EGR valve disposed in the exhaust manifold and that may be adjustable between a closed position wherein the at least one cylinder is isolated from the turbine and in communication with the cold EGR valve and an open position where the at least one cylinder is in communication with the turbine.

In yet another aspect, an internal combustion engine is disclosed that may include a cold exhaust gas recirculation (EGR) valve and an intake manifold that receives recirculated exhaust gas from the cold EGR valve. The engine may further include a plurality of combustion cylinders in communication with the intake manifold and an exhaust manifold in communication with the combustion cylinders as well as a variable geometry turbocharger (VGT) that includes a VGT turbine in communication with the exhaust manifold and that is coupled to a high pressure compressor (HPC) that is in communication with the intake manifold. The engine may further include a hot EGR valve that may be disposed in the exhaust manifold and that may have a closed position wherein at least one of the cylinders is isolated from the VGT turbine and in communication with the cold EGR valve. The hot EGR valve may also have an open position wherein the plurality of combustion cylinders are in communication with the VGT turbine. The hot EGR valve may also be adjustable between the open and closed positions. The HPC may also be in communication with an air inlet and a low pressure compressor (LPC). The air inlet may also be in communication with a bypass valve disposed between the HPC and the air inlet. The bypass valve may have a closed position that directs all incoming air to the low pressure compressor and an open position that provides at least some communication between the air inlet and the HPC.

DETAILED DESCRIPTION

Figures 1, 2:
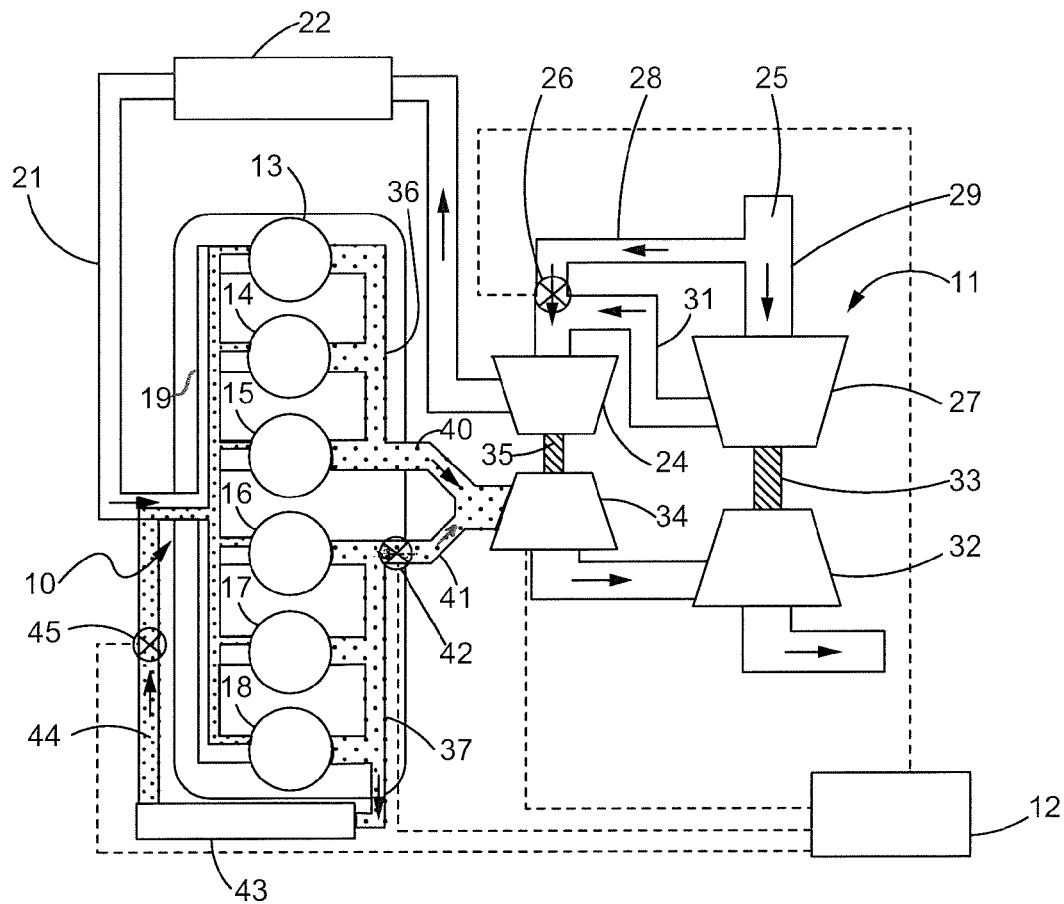
FIG. 1 schematically illustrates a disclosed EGR system associated with a six cylinder internal combustion engine.
FIG. 2 is an operating map for the engine shown in FIG. 1 equipped with the EGR system shown in FIG. 1, particularly illustrating the sixteen data points listed in Table 1 below.

Turning to FIG. 1, an internal combustion engine 10 is shown that is equipped with an exhaust gas recirculation (EGR) system 11 and an engine control module (ECM) 12. The engine 10 is shown with six cylinders 13-18, but the number of cylinders for purposes of this disclosure is largely irrelevant. The disclosed EGR system 11 may be employed with engines having a single or at least one cylinder or more than six cylinders as shown in FIG. 1. The cylinders 13-18 are in communication with an intake manifold 19 that directs a combination of incoming air and recirculated exhaust to each cylinder as shown in FIG. 1. Specifically, the intake manifold 19 is in communication with an air inlet line 21 that may pass through a cooler 22 before it reaches the intake manifold 19. The air inlet line 21 may also receive air from a high pressure compressor (HPC) 24 which may receive incoming air from an air intake 25 via a bypass valve 26 and a low pressure compressor (LPC) 27. The LPC 27 may be equipped with a vaned diffuser. The bypass valve 26, when open, allows air from the air intake 25 to pass through the conduit 28, through the valve 26 and to the HPC 24. When closed, the bypass valve 26 prevents fresh air from passing through the conduit 28 to the HPC 24. Thus, air enters the air intake 25 and proceeds through the conduit 29 to the LPC 27, which then may pressurize and propel the air through the conduit 31 to the HPC 24.

The HPC 24 and LPC 27 are driven by a pair of turbines as shown in FIG. 1. Specifically, a low pressure turbine (LPT) 32 may be coupled to the LPC 27 via a shaft 33 or other arrangement that will be apparent to those skilled in the art. A high pressure turbine (HPT) 34 may be used to drive the HPC 24 via a shaft 35 or other arrangement that will also be apparent to those skilled in the art. The HPT 34 may be part of a variable geometry turbocharger (VGT), wherein the distance between the vanes (not shown) and the rotors (not shown) of the HPT 34 may be varied to alter the performance of the EGR system 11. Therefore, the HPT 34 will hereinafter be referred to as the "VGT turbine" 34, although the use of a variable-geometry turbocharger is not required.

The VGT turbine 34 is driven by exhaust gases exiting the dual exhaust manifolds 36, 37 that deliver exhaust gases to the conduits 40, 41 as shown in FIG. 1. The conduit 41 may include a control valve referred to herein as the hot EGR valve 42. When closed, the hot EGR valve 42 blocks flow from the exhaust manifold 37 to the conduit 41 thereby causing the exhaust gases from the cylinders 16, 17, 18 to be recirculated through the manifold 37, through an optional EGR cooler 43 and into the conduit 44. The conduit 44 includes another control valve, referred to herein as the cold EGR valve 45. The hot EGR valve 42, cold EGR valve 45 and bypass valve 26 may be linked to the ECM 12 as shown in FIG. 1.

Thus, FIG. 1 illustrates the use of three valves, including a bypass valve 26, a hot EGR valve 42 and a cold EGR valve 45 for controlling the EGR system 11. In addition to the valves 26, 42, 45, other components of the EGR system 11 may be used to control the EGR system 11. For example, the VGT turbine 34, as discussed above, may include adjustable vanes which enables the operator to adjust the spacing between the vanes (not shown) and the rotors (not shown). When the vanes are extended so that they are close to, but not engaging, the rotating rotors, the vane position is considered closed or assigned a valve of zero (0) in Table 1 below. When the vanes are fully retracted away from the rotating rotors, the vanes are considered to be in an open position and assigned a value of 1.00 in Table 1 below. The vane positions of the VGT turbine 34 for various torques and engine speeds are listed below in Table 1 under the column heading "VGT turbine 34 vanes".

Similarly, when one of the valves 26, 42, 45 is fully open, it is assigned a value of 1.00 in Table 1 below and when such a valve 26, 42 or 45 is fully closed, it is assigned a value of 0.00 in Table 1. The valves 26, 42 and 45 are adjustable between fully open (1.00) and fully closed (0.00) positions and these adjustable positions are assigned numerical values that range from 0.00 to 1.00 in Table 1. Table 1 also shows the exhaust gas recirculation percentage that exceeds 50% at numerous torque speeds A100, A75, A50, ANTE+, B100, B50, BNTE+, C100, C75, C50 and CNTE+. The only values in Table 1 where the EGR % drops below 50% are the data points designated as ANTE−, BNTE− and CNTE−, which are disposed outside of the not to exceed boundary line 47 of FIG. 2. Table 1 also lists the air-to-fuel ratio (AFR) for each data point.

TABLE 1

| | Hot EGR valve 42 | Cold EGR valve 45 | VGT turbine 34 vanes | Bypass valve 26 | EGR % | AFR |
|---|---|---|---|---|---|---|
| Low Idle | 1.00 | 0.00 | 0.45 | 1.00 | 7 | 60 |
| Peak Torque Speeds | | | | | | |
| A100 | 0.00 | 1.00 | 0.75 | 0.00 | 50 | 20 |
| A75 | 0.15 | 1.00 | 0.64 | 0.15 | 51.5 | 25 |
| A50 | 0.17 | 1.00 | 0.57 | 0.25 | 52 | 20 |
| ANTE+ | 0.20 | 1.00 | 0.50 | 1.00 | 56 | 40 |
| ANTE− | 1.00 | 0.00 | 0.60 | 1.00 | 7 | 37 |
| Intermediate Speeds | | | | | | |
| B100 | 0.00 | 1.00 | 0.77 | 0.00 | 50 | 25 |
| B50 | 0.15 | 1.00 | 0.69 | 0.00 | 52 | 24 |
| BNTE+ | 0.20 | 1.00 | 0.57 | 1.00 | 56 | 45 |
| BNTE− | 1.00 | 0.00 | 0.67 | 1.00 | 7 | 40 |
| Rated Speeds | | | | | | |
| C100 | 0.00 | 1.00 | 0.80 | 0.00 | 50 | 22 |
| C75 | 0.15 | 1.00 | 0.75 | 0.00 | 51.5 | 20 |
| C50 | 0.17 | 1.00 | 0.70 | 0.00 | 53 | 40 |
| CNTE+ | 0.20 | 1.00 | 0.65 | 1.00 | 56 | 50 |
| CNTE− | 1.00 | 0.00 | 0.75 | 1.00 | 7 | 45 |
| High Idle | 1.00 | 0.00 | 0.65 | 1.00 | 7 | 60 |

Turning to FIG. 2, a series of peak or high torque speeds A100, A75, A50 and ANTE+ (i.e. high loads) are achievable with the valves 26, 42, 45 and the VGT turbine vanes appropriately adjusted to enable the EGR system 11 to achieve EGR flow rates exceeding 50%. Similarly, FIG. 2 and Table 1 illustrate that a variety of intermediate speeds B100, B50 and BNTE+ with an EGR % of greater than 50% can be achieved with appropriate adjustment of the valves 26, 42, 45 and the vanes of the VGT turbine 34. Similarly, various rated, low torque speeds C100, C75, C50 and CNTE+ with an EGR % of greater than 50% can also be achieved using appropriate adjustment of the valves 26, 42, 45 and the vanes of the VGT turbine 34.

Still referring to Table 1 and FIG. 2, at low idle (LI), the cold EGR valve 45 is fully closed and the hot EGR valve 42 is fully open. Further, the bypass valve 26 is also fully open. The vanes of the VGT turbine 34 are also closed to provide adequate back pressure for the EGR system 11. As the engine speed is increased, the cold EGR valve 45 is opened and the hot EGR valve 42 is also opened as shown by the data point ANTE− in Table 1. Further, the vanes of the VGT turbine 34 are also opened from the low idle starting position of 0.45. As the engine load or torque increases, the cold EGR valve 45 remains fully open and the hot EGR valve 42 is adjusted towards its closed position as can be seen by comparing the hot EGR valve 42 positions for the data points ANTE−, ANTE+, A50, A75 and A100 in Table 1. The hot EGR valve 42 is closed to limit the EGR %. The bypass valve 26 remains open at minimum loads and is closed as the load increases which, again, can be seen by comparing the bypass valve 26 positions of the data points ANTE−, ANTE+, A50, A75 and A100.

Thus, the hot EGR valve 42 remains fully open at low torques and fully closed at full or high torque (compare ANTE− and A100; BNTE− and B100; and CNTE− and C100). An algorithm that can be used to calculate the hot EGR valve 42 position can be expressed as follows: hot EGR valve 42 position=1−(actual engine torque)/(max engine torque).

Further, the cold EGR valve 45 generally remains open at sea level and may be closed with increases in altitude. It will be noted that the only data points for which the cold EGR valve 45 is closed in Table 1 are the data points that fall outside of the not to exceed line 47, that is ANTE−, BNTE−, CNTE−, LI and HI. An algorithm that may be used to calculate the position of the cold EGR valve 45 may be expressed as follows: cold EGR valve 45 position=1−(actual engine altitude)/(max engine altitude).

The vanes of the VGT turbine 34 are generally positioned about half open at low idle (LI) and are adjusted to reach peak efficiencies at full speed at sea level. An algorithm that may be used to calculate the positions of vanes of the VGT turbine 34 may be expressed as follows: vane position of VGT turbine 34=(actual engine speed−min engine speed)/(max engine speed−min engine speed)×(max turbine efficiency vane position−low idle vane position)+(low idle vane position).

Finally, the bypass valve 26 position is generally fully open at low torque or low loads and is fully closed at full torque or high loads. An algorithm for calculating the correct position of the bypass valve 26 may be expressed as follows: bypass valve 26 position=1−(actual engine torque−min engine torque)/(max engine torque−min engine torque).

INDUSTRIAL APPLICABILITY

By controlling airflow and the EGR system 11 independently, a zero NO or reduced $NO_x$ exhaust treatment solution is provided without the engine 10 being fluidly connected to a SCR system. The EGR system 11 includes the use of dual EGR valves including a hot EGR valve 42 as well as a cold EGR valve 45. By associating the hot EGR valve with the exhaust manifold 37, the exhaust gases from half of the cylinders 16, 17, 18 can be fully recycled reaching an EGR % of 50% as shown by the data points A100, B100, C100 in Table 1 above. Further, while the cold EGR valve 45 may remain open, the hot EGR valve 42 may be partially opened as the VGT turbine 34 vanes and bypass valve 26 are adjusted to achieve EGR rates exceeding 50%. For example, referring to the peak torque speeds of Table 1, and comparing the EGR percentages for the peak torque speeds A75, A50 and ANTE+, as the hot EGR 42 is opened and the VGT turbine 34 vanes are moved towards a closed position while the bypass valve 26 is moved towards an open position, the EGR rate increases to a level exceeding 50%. Similar results are also obtained for the intermediate speeds B100, B50, BNTE+ and the rated speeds C75, C50 and CNTE+ as shown in Table 1.

The increased EGR % can enable a manufactures to reach the Tier4 emission standards without resulting to a selective catalytic reduction (SCR) system thereby saving space, weight as well as costs.

What is claimed is:

1. A method for controlling an internal combustion engine, the engine including an engine block defining a plurality of cylinders, an intake manifold, an exhaust manifold, a controller and an exhaust gas recirculation (EGR) system, the EGR system including a cold EGR valve in communication with the intake manifold and a hot EGR valve in communication with the exhaust manifold, the EGR system circulating a portion of exhaust gases from the exhaust manifold to the intake manifold through the cold EGR valve, the controller communicating with the hot and cold EGR valves, the EGR system further including a high pressure turbine (HPT) disposed downstream of the hot EGR valve, the HPT coupled to a high pressure compressor (HPC) for driving the HPC, the EGR system further including a low pressure turbine (LPT) disposed downstream of the HPT turbine, the LPT coupled to a low pressure compressor (LPC) for driving the LPC, the LPC in communication with the HPC and an air inlet, the HPC also in communication with a bypass line that is in communication with the air inlet, the bypass line including a bypass valve for controlling air flow from the air inlet to the HPC, the method comprising:
   as the engine torque increases, at least partially closing the hot EGR valve and at least partially closing the bypass valve for a given engine speed;
   as the engine torque decreases, at least partially opening the hot EGR valve and at least partially opening the bypass valve for the given engine speed;
   wherein the portion of exhaust gases provided to the plurality of cylinders by the EGR system is greater than 40% of the total exhaust gases output from all of the cylinders.

2. The method of claim 1 wherein the portion of exhaust gases provided to the plurality of cylinders by the EGR system ranges from about 40% to about 60% of the total exhaust gases output from all of the cylinders.

3. The method of claim 1 wherein the portion of exhaust gases provided to the plurality of cylinders by the EGR system ranges from about 44% to about 56% of the total exhaust gases output from all of the cylinders.

4. The method of claim 1 further including:
   as engine torque increases, fully opening the cold EGR valve and at least partially closing the hot EGR valve while maintaining a constant engine speed.

5. The method of claim 1 wherein the HPT is a variable geometry turbocharger (VGT) turbine having a plurality of vanes and rotor blades, the vanes being adjustable between an open position having a maximum gap between the vanes and rotor blades and a closed position having a minimum gap between the vanes and rotor blades, the method further including:
   as engine torque increases, adjusting the plurality of vanes at least partially towards the open position for a given engine speed; and
   as engine torque decreases, adjusting the plurality vanes at least partially towards the closed position for the given engine speed.

6. The method of claim 1 wherein the HPT is a variable geometry turbocharger (VGT) turbine having a plurality of vanes and rotor blades, the vanes being adjustable between an open position having a maximum gap between the vanes and rotor blades and a closed position having a minimum gap between the vanes and rotor blades, the method further including:
   as engine speed increases, adjusting the plurality of vanes at least partially towards the open position for a given engine torque; and
   as engine speed decreases, adjusting the plurality vanes at least partially towards the closed position for the given engine torque.

7. The method of claim 1 wherein the engine is not fluidly connected to a selective catalytic reduction (SCR) system.

8. An internal combustion engine comprising:
   a cold exhaust gas recirculation (EGR) valve that is adjustable between an open position and a closed position;
   an intake manifold that receives recirculated exhaust gas from the cold EGR valve when the cold EGR valve is not in the closed position;
   at least one combustion cylinder in communication with the intake manifold;
   an exhaust manifold in communication with the at least one combustion cylinder and a turbine;
   a hot EGR valve disposed in the exhaust manifold and being adjustable between a closed position wherein the at least one cylinder is isolated from the turbine and in communication with the cold EGR valve and an open position wherein the at least one cylinder is in communication with the turbine.

9. The engine of claim 8 wherein the turbine is a variable geometry turbocharger (VGT) turbine.

10. The engine of claim 8 wherein, in the open position, the at least one cylinder is also in communication with the cold EGR valve.

11. The engine of claim 8 including:
   a low pressure compressor (LPC) in communication with an air inlet and a high pressure compressor (HPC);
   the air inlet also in communication with a bypass valve that is disposed between the air inlet and the HPC, the HPC in communication with the intake manifold;
   the bypass valve having a closed position that directs all incoming air to the LPC and an open position that provides at least some communication between the air inlet and the HPC.

12. The engine of claim 8 wherein the at least one combustion cylinder includes at least two cylinders, at least one of the at least two cylinders being isolated from the turbine when the hot EGR valve is closed.

13. The engine of claim 12 wherein at least one of the at least two cylinders being in communication with the turbine when the hot EGR valve is open and when the hot EGR valve is closed.

14. The engine of claim 8 wherein the turbine is a variable geometry turbocharger (VGT) turbine having a plurality of vanes and rotor blades, the vanes being adjustable between an open position having a maximum gap between the vanes and rotor blades and a closed position having a minimum gap between the vanes and rotor blades,
   wherein, as engine torque decreases, adjusting the plurality of vanes at least partially towards the open position for a given engine speed, and
   wherein, as engine torque decreases adjusting the plurality vanes at least partially towards the closed position for the given engine speed.

15. The engine of claim 8 wherein the turbine is a variable geometry turbocharger (VGT) turbine having a plurality of vanes and rotor blades, the vanes being adjustable between an open position having a maximum gap between the vanes and rotor blades and a closed position having a minimum gap between the vanes and rotor blades,
   wherein, as engine speed increases, adjusting the plurality of vanes at least partially towards the open position for a given engine torque, and
   wherein, as engine speed decreases, adjusting the plurality vanes at least partially towards the closed position for the given engine torque.

16. An internal combustion engine comprising:
   a cold exhaust gas recirculation (EGR) valve;
   an intake manifold that receives recirculated exhaust gas from the cold EGR valve;
   a plurality of combustion cylinders in communication with the intake manifold;
   an exhaust manifold in communication with the combustion cylinders and a variable geometry turbocharger (VGT) turbine;
   a hot EGR valve disposed in the exhaust manifold and having a closed position wherein the at least one of the cylinders is isolated from the VGT turbine and in communication with the cold EGR valve, the hot EGR valve also having an open position wherein the plurality of combustion cylinders are in communication with the VGT turbine, the hot EGR valve also being adjustable between the open and closed positions;

a low pressure compressor (LPC) in communication with an air inlet and a high pressure compressor (HPC), the HPC being coupled to and driven by the VGT turbine;

the air inlet also in communication with a bypass valve disposed between the HPC and the air inlet, the HPC in communication with the intake manifold;

the bypass valve having a closed position that directs all incoming air to the LPC and an open position that provides at least some communication between the air inlet and the HPC.

17. The engine of claim 16 wherein the LPC includes a vaned diffuser.

18. The engine of claim 16 wherein the plurality of combustion cylinders includes at least two cylinders, at least one of the at least two cylinders being isolated from the VGT turbine when the hot EGR valve is closed and while the other of the at least two cylinders being in communication with the VGT turbine when the hot EGR valve is open and when the hot EGR valve is closed.

* * * * *